Patented Oct. 6, 1925.

1,555,944

UNITED STATES PATENT OFFICE.

PAUL COMMENT AND DANIEL HATT, OF THANN, FRANCE, ASSIGNORS TO FABRIQUES DE PRODUITS CHIMIQUES DE THANN ET DE MULHOUSE, OF THANN, HAUT-RHIN, FRANCE.

PROCESS OF MANUFACTURE OF CYANIDES AND THEIR DERIVATIVES FROM THE ALKALI-EARTH-METAL CYANAMIDES.

No Drawing.   Application filed January 25, 1924. Serial No. 688,618.

*To all whom it may concern:*

Be it known that we, PAUL COMMENT, a citizen of Switzerland, and DANIEL HATT, a citizen of France, both residents of Thann, Haut-Rhin, France, have invented new and useful Improvements in Processes of Manufacture of Cyanides and Their Derivatives from the Alkali-Earth-Metal Cyanamides, which is fully set forth in the following specification.

This invention relates to a process of manufacture of the cyanides and their derivatives from alkali earth metal cyanamides.

It is a matter of common knowledge for more than twenty years past that the cyanides can be obtained by heating to a high temperature a mixture of calcium cyanamide and carbon, or of calcium cyanamide alone, or further, a mixture of calcium cyanamide and an alkali metal or alkali earth metal flux with or without carbon. This reaction takes place at temperatures near 900° C. and upwards.

On the other hand, it is ascertained that the addition of small quantities of carbide to the said mixtures will further the reaction, this being probably due to the fact that the carbide, by its presence during the fusion of the mass, diminishes the very prejudicial formation of foamings (H. P. Eastman, Canadian Patent 188,259 of January 14, 1919; W. S. Landis U. S. Patent 1,359,257 of November 16, 1920; and Chem. Met. Eng. vol. 22 pages 265-8 (1920); H. Freeman U. S. P. 1,277,900 of September 3, 1918).

We have found that if calcium cyanamide is treated with a mixture of alkali metal carbonates and alkali earth metal carbide in well-defined proportions, cyanides will be formed, this taking place with nearly the theoretical yield, and at a much lower temperature than in the known processes, or in certain cases as low as 500° C.

To obtain this result in a complete manner, perfectly dry materials must be used, but this offers no practical difficulties. The presence of even the smallest quantity of water in the mixture of the said substances will in fact produce secondary reactions accompanying the main reaction, resulting in considerable losses of nitrogen in the form of ammonia or of nitrogen gas.

No melting occurs when the mass is heated, but the mass slightly adheres together, and the product obtained upon cooling is very friable and porous, so that no preliminary crushing is necessary for the extraction of pure cyanide, and this offers a great advantage by reason of the toxic nature of the product.

The reaction takes place very rapidly with a considerable exothermic action, so that large quantities of cyanide can be produced with a continuously operated apparatus of relatively small size.

The carbide employed enters into reaction entirely, and it has been observed that in order to obtain results which are close to the theoretical values, carbide must be used in quantities equal to or below what are indicated by the equations

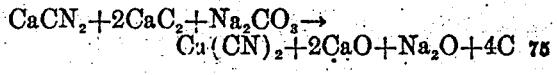
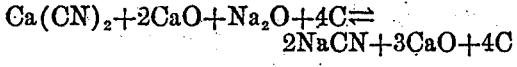

The calcium cyanamide and the carbon employed will both contain a considerable amount of carbon. It is admitted that a small amount of this carbon reacts directly with the calcium cyanamide in spite of the relatively low temperature, and this explains why one may employ somewhat smaller quantities of carbide than indicated in the preceding equations without reducing the output of cyanide. When the amount of carbide is reduced below a certain limit, the output of cyanide for a given temperature is considerably diminished; in this event the yield is not much increased by a rise of temperature of 200° or less.

The action of the carbide is therefore of a specific and essential nature in our said process. The carbide itself takes part in the reaction, its part being by no means secondary, and it disappears (as such) during the said reaction.

The reaction takes place without the addition of a flux. The alkali metal carbonates take part in said reaction; their carbonic acid is reduced to carbon and nothing remains in addition to the cyanides produced except the alkali metal and alkali earth metal oxides and large quantities of carbon. The reaction takes place without disengagement of gas. The preparation of the pure cyanides from the mass resulting from the reaction is facilitated from the fact that the alkali metal carbonates disappear during the process.

It is in fact due to the use of the alkali metal carbonates that the alkali earth metal carbide enters into reaction in the above-mentioned conditions; it is observed that when these are replaced by the corresponding chlorides, while maintaining the other conditions of the process as before, the carbide will remain substantially intact, and the output of cyanide is inappreciable.

The carbon is formed during the process in the proportions indicated by the preceding equations, and it affords a product which is remarkable for its decoloring properties.

It has been further observed that in the presence of iron, or of oxides or other compounds of iron, one may obtain the whole or a part of the cyanide in the form of a salt of hydro-ferrocyanic or hydro-ferricyanic acids; in this case the presence of sulphur derivatives in the components, for instance sulphate or sulphides, will cause the formation of sulphocyanides.

The originality and simple character of the said process is more clearly shown in the following example.

17,800 kilograms of dry calcium cyanamide containing 19% nitrogen, 13 kilogrammes of dry Solvay carbonate of soda and 18,500 kilogrammes of dry calcium carbide containing 70% of $CaC_2$ are finely ground, intimately mixed and heated to 550° C. in the manner above indicated. The mass is then allowed to cool without special precautions. The resulting product which is of a very friable nature will contain 21.8% of cyanide, estimated as NaCN.

The mass thus obtained can be used for the production of pure cyanides and derivatives of cyanides by the known means. The insoluble residue is washed with hydrochloric acid, and there will remain 8,200 kilogrammes of carbon (affording 20% ash when calcined).

Another method of carrying the said process into effect consists in the use as raw material mixed with the alkali metal compounds, of cyanamide containing an insufficient amount of nitrogen, i. e. having an excess of calcium carbid which is not converted into cyanamide, in a suitable proportion for the desired end. This product can be obtained during the preparation of cyanamide by arresting the nitrification at a certain time.

What we claim is:—

1. A process of manufacture of cyanides of the alkali metals which consists in mixing calcium cyanamide, calcium carbide and a carbonate of an alkali metal, in the proportions given by the equations:

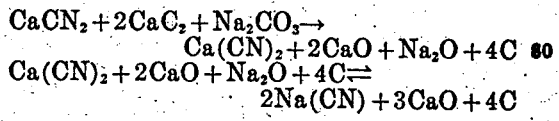

and in heating the mixture in such manner that the quantitative yield of cyanide according to the equations will be approximately attained.

2. A process of manufacture of cyanides of the alkali metals which consists in mixing calcium cyanamide, calcium carbide and a carbonate of an alkali metal, in the proportions given by the equations:

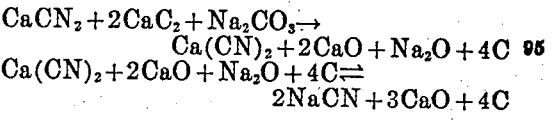

and in heating the resulting pulverulent and homogeneous mixture to some 500° C. whereby the yield of cyanide according to the equations will be obtained.

In testimony whereof we have signed this specification.

PAUL COMMENT.
DANIEL HATT.